(12) United States Patent
Derat (10) Patent No.: US 11,671,186 B1
(45) Date of Patent: Jun. 6, 2023

(54) METHOD OF DETERMINING AN EQUIVALENT SOURCE AND OVER-THE-AIR TEST SYSTEM

(71) Applicant: Rohde & Schwarz GmbH & Co. KG, Munich (DE)

(72) Inventor: Benoit Derat, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 17/687,288

(22) Filed: Mar. 4, 2022

Related U.S. Application Data

(63) Continuation-in-part of application No. 17/592,747, filed on Feb. 4, 2022.

(51) Int. Cl.
*G01R 27/04* (2006.01)
*H04B 17/00* (2015.01)

(52) U.S. Cl.
CPC ................. *H04B 17/0085* (2013.01)

(58) Field of Classification Search
CPC .. G01R 29/10; G01R 29/105; G01R 29/0814; G01R 29/0821; G01R 29/0878; G01R 29/0892; G01R 29/0871
See application file for complete search history.

(56) References Cited

U.S. PATENT DOCUMENTS

| 8,103,470 B2 | 1/2012 | Teshirogi et al. |
| 8,531,343 B1 | 9/2013 | Henrie |
| (Continued) | | |

OTHER PUBLICATIONS

Derat, B. et al., "Base Station Specific Absorption Rate Assessment Based on a Combination of Over-The-Air Measurements and Full-Wave Electromagnetic Simulations," 2021 Antenna Measurement Techniques Association Symposium (AMTA), 2021, pp. 1-6.

(Continued)

*Primary Examiner* — Thang X Le
(74) *Attorney, Agent, or Firm* — Christensen O'Connor Johnson Kindness PLLC (57) ABSTRACT

A method of determining an equivalent source associated with a device under test by an over-the-air test (OTA) test system is described. The OTA test system includes an analysis circuit and at least one measurement antenna. The method includes the steps of: conducting, by the at least one measurement antenna, at least two sets of measurements of electromagnetic waves emitted by the device under test, thereby generating measurement signals associated with the electromagnetic waves; determining, by the analysis circuit, at least one radiation parameter of the device under test based on the measurement signals, wherein the at least one radiation parameter is associated with the electromagnetic waves emitted by the device under test; and determining, by the analysis circuit, an equivalent source on a Huygens surface based on the at least one determined radiation parameter, wherein the equivalent source is associated with the device under test. The at least two sets of measurements are conducted on at least two measurement surfaces, wherein the at least two measurement surfaces are different from each other. Further, an OTA test system is described.

20 Claims, 3 Drawing Sheets

(56) References Cited

U.S. PATENT DOCUMENTS

| | | | | |
|---|---|---|---|---|
| 2002/0039030 A1* | 4/2002 | Khazei | ................ | G01R 31/002 324/754.29 |
| 2007/0024293 A1* | 2/2007 | Kosaka | ................ | G01R 31/001 324/754.21 |
| 2010/0285753 A1* | 11/2010 | Foegelle | ................ | H04B 17/21 455/67.12 |
| 2013/0002275 A1* | 1/2013 | Min | ................... | G01R 31/3191 324/750.02 |
| 2019/0162780 A1 | 5/2019 | Danz | | |

OTHER PUBLICATIONS

Derat, B. et al., "Evaluation of Integrated Antenna Performance through Combined Use of Measurement and Full-Wave Simulation," 2020 Antenna Measurement Techniques Association Symposium (AMTA), 2020, pp. 1-5.

Wong, A.M.H., "Active Huygens' Box: Arbitrary Electromagnetic Wave Generation With an Electronically Controlled Metasurface," in IEEE Transactions on Antennas and Propagation, vol. 69, No. 3, pp. 1455-1468, Mar. 2021.

* cited by examiner

METHOD OF DETERMINING AN EQUIVALENT SOURCE AND OVER-THE-AIR TEST SYSTEM

CROSS-REFERENCE TO RELATED APPLICATION

This application is a continuation-in-part of U.S. patent application Ser. No. 17/592,747, filed on Feb. 4, 2022, the entire disclosure of which is hereby incorporated by reference.

FIELD OF THE DISCLOSURE

Embodiments of the present disclosure generally relate to a method of determining an equivalent source associated with a device under test by an over-the-air test (OTA) test system. Embodiments of the present disclosure further relate to an OTA test system.

BACKGROUND

With increasing complexity of modern wireless communication devices, it is becoming increasingly more important to test a large variety of different application scenarios in order to ensure a correct functionality of an electronic equipment the characteristics of which are tested accordingly. Thus, the electronic equipment corresponds to a device under test during the respective testing.

However, performing tests for all the different application scenarios is time-consuming and rather expensive, as the device under test has to be tested with a plurality of different objects in the environment of the device under test.

In the technical field of OTA testing, hybrid approaches between performing actual OTA measurements and simulations are known.

In these hybrid approaches, certain OTA measurements are performed in order to test the transmission properties of the device under test in an undisturbed environment.

Based on the conducted measurements, simulations of the device under test in different environments are performed, wherein the device under test may be modelled as an equivalent source.

For the simulations, it is important that the properties of the device under test are captured with high precision, such that the equivalent source closely resembles the actual properties of the device under test.

Thus, there is a need for a method of determining an equivalent source associated with a device under test by an OTA test system, and for an OTA test system that allow for determining the equivalent source with enhanced precision.

SUMMARY

Embodiments of the present disclosure provide a method of determining an equivalent source associated with a device under test by an over-the-air test (OTA) test system. The OTA test system comprises an analysis circuit and at least one measurement antenna. In an embodiment, the method comprises the steps of:

conducting, by the at least one measurement antenna, at least two sets of measurements of electromagnetic waves emitted by the device under test, thereby generating measurement signals associated with the electromagnetic waves;

determining, by the analysis circuit, at least one radiation parameter of the device under test based on the measurement signals, wherein the at least one radiation parameter is associated with the electromagnetic waves emitted by the device under test; and determining, by the analysis circuit, an equivalent source on a Huygens surface based on the at least one determined radiation parameter, wherein the equivalent source is associated with the device under test.

The at least two sets of measurements are obtained by conducting the respective measurements on at least two measurement surfaces, wherein the at least two measurement surfaces are different from each other. The measurement surface(s) may define the location of the at least one measurement antenna during the respective measurement. Put differently, the at least one measurement antenna is located on the respective measurement surface(s) when conducting the respective measurement.

Therein and in the following, it is to be understood that the at least one radiation parameter is determined based on actual OTA measurements of the device under test. More precisely, the at least one radiation parameter is determined by conducting the at least two sets of measurements by the at least one measurement antenna. The analysis circuit may receive the electromagnetic waves or representatives thereof and, additionally, the analysis circuit may analyze the received electromagnetic waves or the representatives thereof in order to determine the at least one radiation parameter.

On the other hand, the equivalent source is a mathematical object that may be determined based on a physical model of the device under test. In general, the equivalent source is determined such that (simulated) electromagnetic waves emitted by the equivalent source are the same as the actual electromagnetic waves emitted by the device under test, at least in a region outside of the device under test.

The equivalent source may then be used, by another measurement application or by the OTA test system, in order to simulate the properties of the device under test in a variety of different scenarios. In some embodiments, interactions of the electromagnetic waves emitted by the device under test with a scattering object may be simulated.

Accordingly, the OTA test system may be a hybrid OTA test system.

For example, the scattering object may be an object in the environment of the device under test, such as a car or another vehicle, certain components of a car or of another vehicle, a tree or other plants, a building, a mountain, etc.

As a further example, the scattering object may correspond to biological material. For example, the scattering object may be a human or a certain body part of a human, for example a human head or a human torso.

Thus, a realistic simulation of an interaction of the device under test with biological material matter is provided, for example of the absorption of electromagnetic waves generated by the device under test in the biological material.

For example, with the method according to one or more embodiments of the present disclosure, the electromagnetic exposure of a person standing nearby a low-power indoor cell can be evaluated with high precision based on OTA measurements without actually exposing a human to the electromagnetic waves. This is achieved by measuring a base station of the low-power indoor cell in free space or in an OTA chamber and then simulating the presence of a human body or mannequin in order to calculate the fields inside the body.

The method according to one or more embodiments of the present disclosure is based on the idea to enhance the precision with which the equivalent source is determined by performing at least two different sets of measurements on at least two different measurement surfaces.

It has turned out that the equivalent source determined by the method according to one or more embodiments of the present disclosure closely resembles the actual electromagnetic properties of the device under test.

This is due to the fact that a single set of measurements alone still may not completely determine the equivalent source in an unambiguous manner Instead, there is a space of possible solutions for the equivalent source.

This space of possible solutions is further confined by performing at least one further set of measurements on another measurement surface.

In some embodiments, several sets of measurements can be performed on several different measurement surfaces, thereby confining the space of possible solutions even further. This way, a particularly accurate equivalent source can be determined.

Moreover, it has turned out that no a priori knowledge about the electromagnetic properties of the device under test are necessary in order to perform any one of the methods according to the present disclosure.

Thus, a precise simulation of the device under test can be provided without any a priori knowledge about the device under test.

The Huygens surface may have a defined arbitrary surface geometry. In some embodiments, the Huygens surface may be a surface that is closely surrounding the device under test.

For example, the Huygens surface may have a similar shape or the same shape as an outer surface of the device under test. Thus, the equivalent source closely resembles the device under test, such that a realistic simulation of the device under test is provided by the equivalent source.

For example, the Huygens surface may be cubical, cuboidal, cylindrical, circular-cylindrical, or spherical. However, the Huygens surface may have any other surface geometry, i.e. the surface geometry may be arbitrarily complex.

According to an embodiment of the present disclosure, the equivalent source comprises at least one equivalent electric current and/or at least one equivalent magnetic current. In general, the at least one equivalent electric current and the at least one equivalent magnetic current are determined such that electromagnetic waves emitted by these currents are the same as electromagnetic waves emitted by the device under test. In other words, the at least one equivalent electric current and the at least one equivalent magnetic current serve as model parameters for the simulation of the device under test.

According to an aspect of the present disclosure, the equivalent source is determined, for example, by solving a corresponding inverse mathematical equation based on the at least one determined radiation parameter. In general, the inverse mathematical equation may relate to sources of electromagnetic radiation comprised in the equivalent source, and to the electromagnetic fields generated by these sources. Accordingly, by solving the inverse mathematical equation, or by fitting parameters of the inverse mathematical equation to the at least one determined radiation parameter, the equivalent source can be determined.

As at least two sets of measurements are taken, the space of possible solution for the inverse mathematical equation is further confined compared to methods known in the state of the art, thus yielding an enhanced accuracy of the determined equivalent source.

In a further embodiment of the present disclosure, a cost functional is provided, wherein the cost functional is associated with a deviation of simulated electromagnetic waves generated by the equivalent source from the measured electromagnetic waves. In other words, the cost functional corresponds to an error measure that indicates how closely the equivalent source resembles the actual electromagnetic properties of the device under test. Thus, if the value of the cost functional is large, further adaptations to the equivalent source may be necessary. If the value of the cost functional is small, the equivalent source is an accurate representation of the device under test.

It is noted that the explanations given above relate to the intuitive definition of a cost functional, wherein a larger value of the cost functional is associated with a larger deviation. However, it is also possible to define the cost functional differently, namely by multiplying the cost functional with (−1). In this case, a larger value of the cost functional is associated with a smaller deviation, and vice versa.

Another aspect of the present disclosure provides that the cost functional is, for example, minimized or maximized in order to determine the equivalent source. As the cost functional describes the deviation of the simulated electromagnetic waves generated by the equivalent source from the measured electromagnetic waves, the optimal equivalent source can be determined by minimizing or maximizing the cost functional (depending on the definition of the cost functional, as described above).

Therein, the term "optimal equivalent source" is understood to denote an equivalent source that resembles the electromagnetic properties of the device under test as closely as possible.

In some embodiments, the equivalent source is determined iteratively based on the at least two sets of measurements. In other words, a first set of measurements may be conducted by the at least one measurement antenna on a first measurement surface. At least one first radiation parameter may be determined based on the first set of measurements, and the equivalent source may be determined based on the at least one determined first radiation parameter. Afterwards, a second set of measurements may be conducted by the at least one measurement antenna on a second measurement surface. At least one second radiation parameter may be determined based on the second set of measurements. Based on the at least one determined second radiation parameter, the determined equivalent source may be adapted in order to match the at least one determined second radiation parameter.

According to another aspect of the present disclosure, more than two sets of measurements are conducted, for example, on more than two measurement surfaces. Thus, several sets of measurements can be performed on several different measurement surfaces, thereby confining the space of possible solutions even further. This way, a particularly accurate equivalent source can be determined.

In some embodiments, the equivalent source may be determined iteratively based on the more than two sets of measurements.

In an embodiment of the present disclosure, the at least one radiation parameter comprises at least one of an amplitude of electromagnetic waves emitted by the device under test and a phase of electromagnetic waves emitted by the device under test. Thus, the equivalent source may be determined such that the equivalent source generates electromagnetic waves matching the amplitude(s) and phase(s) determined.

According to a further aspect of the present disclosure, the at least two measurement surfaces are located, for example, in a near-field region of the device under test, in a far-field region of the device under test, and/or in a transition zone between the near-field region and the far-field region. Thus, the at least one measurement antenna is placed in the near-field region, in the far-field region, and/or in the transition zone of the device under test in order to measure the electromagnetic waves. Accordingly, the equivalent source may be determined based on the measurements conducted in the near-field region, in the far-field region, and/or in the transition zone of the device under test.

In some embodiments, the at least two measurement surfaces each have a defined arbitrary shape, wherein the shapes of the at least two measurement surfaces are different from each other. For example, the measurement surfaces may be spherical, cylindrical, circular-cylindrical, cuboidal, or may have any other shape, as long as the measurement surfaces are different from each other.

However, in general the at least two measurement surfaces are located outside of the Huygens surface.

In an embodiment of the present disclosure, the at least two measurement surfaces each have a defined arbitrary distance from the device under test, wherein the distances of the at least two measurement surfaces from the device under test are different from each other. Thus, while the at least two measurement surfaces may have the same or different shapes, at least their defined arbitrary distances from the device under test are different from each other.

Therein, the term "distance from the device under test" is understood to denote the distance between the device under test and the point of the respective measurement surface being nearest to the device under test.

Alternatively, the term "distance from the device under test" may denote the distance between the device under test and a centroid, i.e. a geometric center of the respective measurement surface.

According to an aspect of the present disclosure, a first one of the at least two measurement surfaces is located, for example, in a near-field region of the device under test, and a second one of the at least two measurement surfaces is located, for example, in a far-field region of the device under test. Thus, the at least two sets of measurements may be performed in different regions, namely in the near-field region and in the far-field region of the device under test.

However, it is to be understood that any other combinations are also possible. For example, a first one of the at least two measurement surfaces is located in a near-field region of the device under test, and a second one of the at least two measurement surfaces is located in a transition zone of the device under test.

Alternatively, a first one of the at least two measurement surfaces is located in a transition zone of the device under test, and a second one of the at least two measurement surfaces is located in a far-field region of the device under test.

According to another aspect of the present disclosure, the at least two measurement surfaces each have, for example, a defined arbitrary center point, wherein distances between the respective center point and the device under test are different from each other. Thus, while the at least two measurement surfaces may have the same or different shapes, at least the distances between the respective defined arbitrary center point and the device under test are different from each other.

For example, the defined arbitrary center point may be a centroid, i.e. a geometric center of the respective measurement surface.

In a further embodiment of the present disclosure, the at least two sets of measurements each comprise a plurality of measurements at different measurement locations on the respective measurement surface. Thus, in each set of measurements, a plurality of measurements is performed at the different measurement locations on the respective measurement surface.

In some embodiments, the at least one radiation parameter comprises at least one of an amplitude of electromagnetic waves emitted by the device under test and a phase of electromagnetic waves emitted by the device under test, wherein the at least one radiation parameter is determined at the different measurement locations.

In other words, in each set of measurements, the amplitude and/or phase of the electromagnetic waves emitted by the device under test may be determined at the different measurement locations.

In some embodiments, the equivalent source is determined based on an adaptive boundary condition. In general, the adaptive boundary condition constrains the space of possible solutions for the equivalent source, such that the equivalent source can be uniquely determined.

According to an aspect of the present disclosure, the equivalent source is determined, for example, based on the Love condition and/or based on a fixed impedance condition. The Love condition and fixed impedance condition are per se well known in the field of electrodynamics. The Love condition and/or the fixed impedance condition serve as a boundary condition for the Huygens surface, such that the equivalent source can be uniquely determined based on the boundary condition.

In general, the Love condition allows to have null fields inside the source volume, i.e. in the Huygens box. Therefore, any change of material properties of the equivalent source, e.g. the assignment of material properties to the Huygens box, has no impact on the free-space radiation of the equivalent source.

In other words, on the outside of the Huygens box, the electromagnetic waves generated by the equivalent source are not affected by the material properties assigned to the inside of the Huygens box. Thus, the simulated radiation properties of the device under test remain unaltered, while the simulated reflection and/or absorption properties are altered as intended by assigning the material properties to the Huygens box. This is described in more detail in U.S. patent application Ser. No. 17/592,747, which is incorporated into the present disclosure in its entirety by reference.

A further aspect of the present disclosure provides that the device under test is placed in an anechoic chamber, wherein the electromagnetic waves are measured in the anechoic chamber. Thus, the electromagnetic waves emitted by the device under test can be measured without any external radiation that could disturb the measurements. Thus, the equivalent source can be determined with high precision.

In an embodiment of the present disclosure, the device under test is a base station or a mobile communication device. For example, the device under test may be a 5G base station or a base station for satellite communication. As another example, the device under test may be a smartphone, a tablet, a Wi-Fi-router, a vehicle communication system, or a mobile radio.

However, it is to be understood that the method according to the present disclosure is suitable for any electronic device that is configured for wireless communication and that can be tested over the air.

Embodiments of the present disclosure further provide an over-the-air (OTA) test system. The OTA test system comprises at least one measurement antenna and an analysis circuit. The OTA test system is configured to conduct, by the at least one measurement antenna, at least two sets of measurements of electromagnetic waves emitted by a device under test, thereby generating measurement signals associated with the electromagnetic waves. The OTA test system is configured to conduct the at least two sets of measurements on at least two measurement surfaces, wherein the at least two measurement surfaces are different from each other. The analysis circuit is configured to determine at least one radiation parameter of the device under test based on the measurement signals, wherein the at least one radiation parameter is associated with the electromagnetic waves emitted by the device under test. The analysis circuit is configured to determine an equivalent source on a Huygens surface based on the at least one determined radiation parameter, wherein the equivalent source is associated with the device under test.

In some embodiments, the OTA test system is configured to perform the method described above.

Regarding the advantages and further properties of the OTA test system, reference is made to the explanations given above with respect to the method, which also hold for the OTA test system and vice versa.

The OTA test system may be configured to perform simulations of the device under test based on the determined equivalent source, for example simulations of interactions between the device under test and at least one scattering object. Accordingly, the OTA test system may be established as a hybrid OTA test system.

According to an aspect of the present disclosure, the OTA test system is configured to adapt a location and/or orientation of the device under test. Alternatively or additionally, the OTA test system is configured to adapt a location and/or orientation of the at least one measurement antenna.

For example, the OTA test system may comprise a DUT holder, wherein the DUT holder is configured to hold the device under test. The DUT holder may be configured to adapt the location and/or the orientation of the device under test.

Alternatively or additionally, the OTA test system may comprise antenna positioning members, wherein the antenna positioning members are configured to adapt the location and/or the orientation of the at least one measurement antenna.

The OTA test system may comprise an anechoic chamber, wherein the anechoic chamber may comprise the DUT holder and/or the antenna positioning members.

In general, the anechoic chamber is configured to shield an interior space of the anechoic chamber from external electromagnetic waves. Thus, if the device under test is placed in the anechoic chamber, measurements can be performed with high precision due to the absence of external radiation.

According to another aspect of the present disclosure, the at least one measurement antenna is located, for example, in a near-field region of the device under test. Accordingly, the equivalent source may be determined based on the measurements conducted in the near-field region of the device under test.

Alternatively, the at least one measurement antenna may be located in a far-field region of the device under test or in a transition zone between the near-field region and the far-field region. Thus, the electromagnetic waves emitted by the device under test may be measured in a far-field region of the device under test and/or in the transition zone.

The analysis circuit may be configured to reconstruct near-field properties of the electromagnetic waves emitted by the device under test by appropriate mathematical transformations, for example by any suitable technique known in the state of the art.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
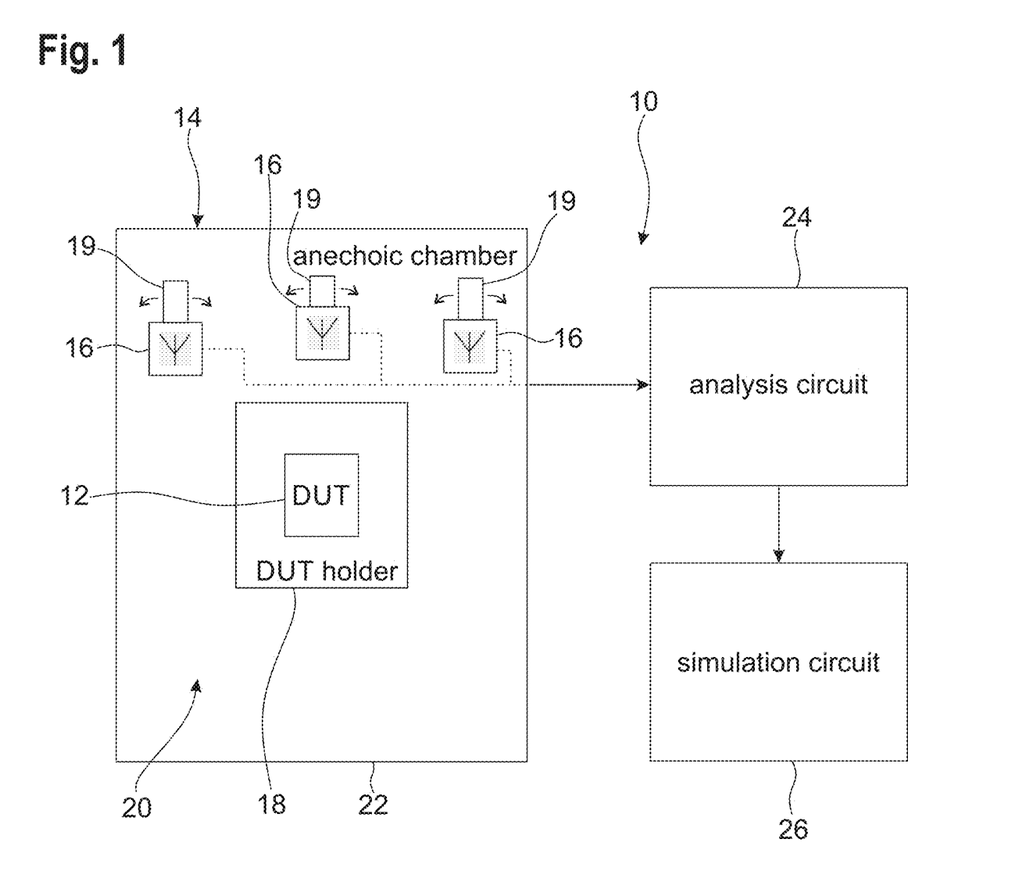
FIG. 1 schematically shows an OTA test system according to an embodiment of the present disclosure.

FIG. 1 schematically shows an over-the-air (OTA) test system 10. In general, the OTA test system 10 is configured to perform OTA measurements on a device under test 12. The OTA test system 10 may further be configured to perform simulations of interactions of the device under test 12 with objects in the environment of the device under test 12 based on the performed OTA measurements, as will be described in more detail below. In other words, the OTA test system 10 may be established as a hybrid OTA test system. Further, the OTA test system 10 may be configured to assess the performance of the device under test 12 based on the OTA measurements and based on the simulations.

The device under test 12 may be any electronic device that is configured for wireless communication. In some embodiments, the device under test 12 may be a base station or a mobile communication device. For example, the device under test 12 may be a 5G base station or a base station for satellite communication. As another example, the device under test 12 may be a smartphone, a tablet, a Wi-Fi-router, a vehicle communication system, a mobile radio, etc.

The OTA test system 10 comprises an anechoic chamber 14, wherein the anechoic chamber 14 comprises at least one measurement antenna 16 and a DUT holder 18. Optionally, the OTA test system 10 comprises antenna positioning members 19 associated with the at least one measurement antenna 16. For example, the at least one measurement antenna 16, the DUT holder 18, and the antenna positioning members 19 are provided in an interior space 20 of the anechoic chamber 14, wherein the interior space 20 is confined by a housing 22 of the anechoic chamber 14.

In the example shown in FIG. 1, the anechoic chamber 14 comprises three measurement antennas 16. However, it is to be understood that the anechoic chamber 14 may comprise any other number of measurement antennas 16. Without restriction of generality, the example of the anechoic chamber 14 comprising three measurement antennas 16 is described in the following.

The housing 22 is configured to shield the interior space 20 from external electromagnetic waves, such that no external electromagnetic waves can propagate into the interior space 20 when the housing 22 is closed, which may impair the measurements performed.

The DUT holder 18 is configured to hold the device under test 12 in a predefined location within the interior space 20. Moreover, the DUT holder 18 is configured to hold the device under test 12 with a predefined orientation. The DUT holder 18 may further be configured to adapt the location and/or orientation of the device under test 12 within the interior space 20.

In some embodiments, the antenna positioning members 19 are configured to adapt the respective location and/or the respective orientation of the measurement antennas 16. For example, such antenna positioning members 19 are known in a plurality of different variants in the state of the art. Accordingly, any type of suitable antenna positioning members 19 may be used in the OTA test system 10 according to the present disclosure.

It will be appreciated that the DUT holder 18 and/or the antenna positioning members 19 may include, in some embodiments, any suitable device, such as one or more linear and/or angular stage(s), robotic apparatus, etc., for adapting the location and/or positioning thereof.

The measurement antennas 16 are configured to receive electromagnetic waves generated by the device under test 12. Optionally, the measurement antennas 16 are configured to transmit electromagnetic waves to the device under test 12.

The measurement antennas 16 may be placed in a near-field region of the device under test 12, such that near-field measurements can be performed by the measurement antennas 16. Alternatively, the measurement antennas 16 may be placed in a far-field region of the device under test 12 or in a transition zone between the near-field region and the far-field region of the device under test 12.

Of course, different measurement antennas 16 may be placed in different regions. For example, a first one of the measurement antennas 16 may be placed in the near-field region of the device under test 12, a second one of the measurement antennas 16 may be placed in a transition zone of the device under test 12, and a third one of the measurement antennas 16 may be placed in a far-field region of the device under test 12. However, it is to be understood that any other arbitrary combination is possible.

Optionally, the measurement antennas 16 may be movable between different measurement positions in the near-field region, in the far-field region, and/or in the transition zone via the antenna positioning members 19.

The OTA test system 10 further comprises an analysis circuit 24 that is connected to the at least one measurement antenna 16 in a signal-transmitting manner Additionally, the OTA test system 10 may comprise a simulation circuit 26 that is connected to the analysis circuit 24 in a signal-transmitting manner. As such, signals can be exchanged between the circuits 24, 26.

Therein and in the following, the term "connected in a signal transmitting manner" is understood to denote a conductor-based, a cable-based or a wireless connection that is configured to transmit signals between the respective devices or rather components.

The analysis circuit 24 and the simulation circuit 26 may be established separately from each other, as is illustrated in FIG. 1. However, the analysis circuit 24 and the simulation circuit 26 may also be integrated into a common circuit or into a common electronic device.

For example, a measurement instrument, such as an oscilloscope, a signal analyzer or a spectrum analyzer, may be provided. The measurement instrument may comprise the analysis circuit 24 and/or the simulation circuit 26. Alternatively or additionally, the analysis circuit 24 and/or the simulation circuit 26 may be integrated into a computing device with suitable software, such as a personal computer, a MAC, a laptop, a notebook, a smartphone, a tablet, or any other type of smart device.

Figure 2:
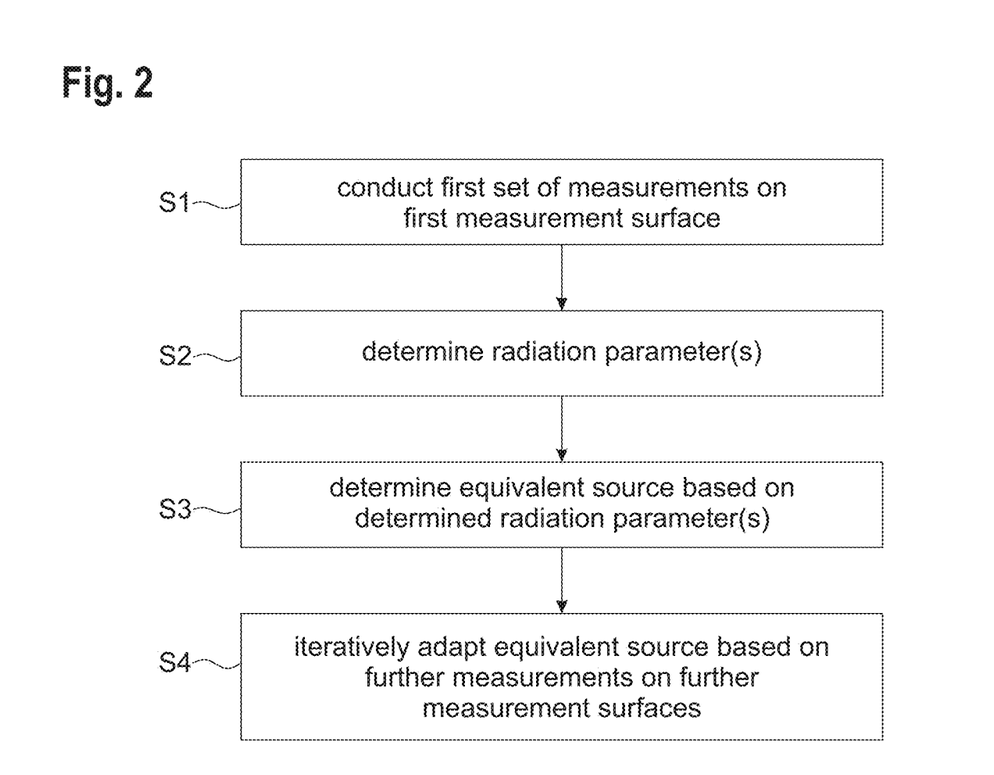
FIG. 2 shows a flow chart of a representative method of determining an equivalent source associated with a device under test by the OTA test system of FIG. 1 according to an embodiment of the present disclosure.

The OTA test system 10 is configured to perform a method of determining an equivalent source associated with the device under test 12, an example of which is described in the following with reference to FIG. 2.

A first set of measurements is conducted by at least one of the measurement antennas 16, for example by a plurality or all of the measurement antennas 16, thereby generating measurement signals associated with electromagnetic waves generated by the device under test 12 (step S1).

Figure 3:
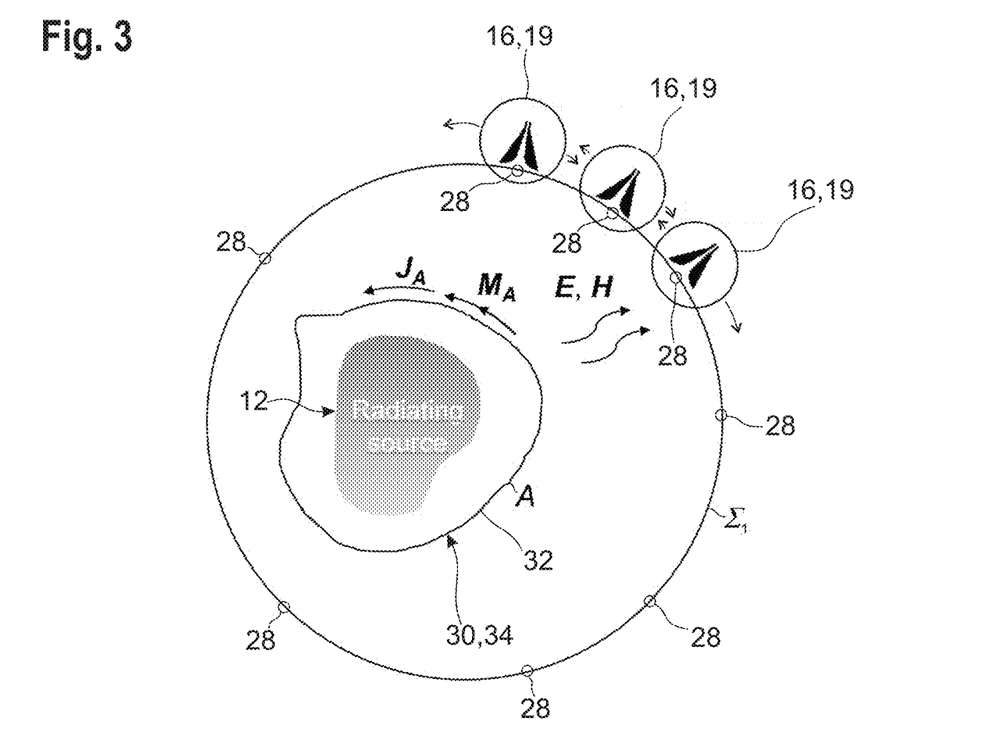
FIG. 3 shows a diagram illustrating individual steps of the method of FIG. 2.

As is illustrated in FIG. 3, the first set of measurements is conducted on a first measurement surface $\Sigma_1$ surrounding the device under test 12, namely at a plurality of measurement locations 28 on the first measurement surface $\Sigma_1$.

In general, the first measurement surface $\Sigma_1$ has a predefined arbitrary shape. For example, the first measurement surface $\Sigma_1$ may be spherical, cylindrical, circular-cylindrical, cuboidal, or may have any other shape.

Further, the first measurement surface $\Sigma_1$ may be located in a near-field region of the device under test 12, in a far-field region of the device under test 12 and/or in a transition zone between the near-field region and the far-field region.

In order to perform the plurality of measurements associated with the first set of measurements, the device under test 12 may be appropriately rotated and/or relocated by the DUT holder 18 between the individual measurements. Alternatively or additionally, the measurement antenna(s) 16 may be appropriately rotated and/or relocated by the antenna positioning members 19.

It is noted that the device under test 12 is represented as a "radiating source" in FIG. 3, as no knowledge about properties of the device under test 12 is necessary in order to perform the steps described above and hereinafter.

At least one radiation parameter is determined by the analysis circuit 24 based on the measurement signals, wherein the at least one radiation parameter is associated with the electromagnetic waves emitted by the device under test 12 (step S2).

In some embodiments, the amplitude and/or phase of the electromagnetic waves generated by the device under test 12 is determined at each of the measurement locations 28 on the first measurement surface $\Sigma_1$. In other words, the at least one radiation parameter may relate to the amplitude(s) and/or phase(s) of the electromagnetic waves generated by the device under test 12.

An equivalent source 30 is determined on a Huygens surface 32 by the analysis circuit 24 based on the at least one determined radiation parameter (step S3). It is noted that in FIG. 3 the Huygens surface 32 is also denoted by "A". As is further illustrated in FIG. 3, the equivalent source 30 comprises at least one equivalent electric current $J_A$ and/or at least one equivalent magnetic current $M_A$ on the Huygens surface 32.

The equivalent source 30, i.e. the at least one equivalent electric current $J_A$ and/or the at least one equivalent magnetic current $M_A$, is a mathematical object that may be determined based on a physical model of the device under test 12. In general, the equivalent source 30 is determined such that (simulated) electromagnetic waves emitted by the equivalent source 30 are the same as the actual electromagnetic waves emitted by the device under test 12, at least in a region outside of the device under test 12, i.e. in a region outside of a Huygens box 34 confined by the Huygens surface 32.

Further, the equivalent source 30 may be determined based on an adaptive boundary condition, for example based on the Love condition or based on a fixed impedance condition. The Love condition is per se well known in the field of electrodynamics. In general, the Love condition allows to have null fields inside the source volume, i.e. it holds E=0 and H=0 in the Huygens box 34.

The equivalent source 30 may be determined by solving a corresponding inverse mathematical equation based on the at least one determined radiation parameter.

For example, the Fast Irregular Antenna Field Transformation Algorithm (FIAFTA) operator may be used, which is defined by:

$$U(\vec{r}_M) = \iiint_{V_{Probe}} \vec{w}_{Probe}(\vec{r} - \vec{r}_M) \cdot \iint_A \left[ \vec{\vec{G}}_J^E(\vec{r}, \vec{r}') \cdot \vec{J}_A(\vec{r}') + \vec{\vec{G}}_M^E(\vec{r}, \vec{r}') \cdot \vec{M}_A(\vec{r}') \right] da' dv$$

Therein, G denotes Green's functions, which are defined by:

$$\vec{\vec{G}}_M^E(\vec{r}, \vec{r}') = -jkZ_F \left( \vec{\vec{I}} + \frac{1}{k^2} \nabla \nabla \right) \frac{e^{-jk|\vec{r} - \vec{r}'|}}{4\pi|\vec{r} - \vec{r}'|}$$

$$\vec{\vec{G}}_M^E(\vec{r}, \vec{r}') = -\frac{1}{4\pi} \nabla \times \vec{\vec{I}} \frac{e^{-jk|\vec{r} - \vec{r}'|}}{4\pi|\vec{r} - \vec{r}'|}$$

However, it is to be understood that any other suitable approach may be used in order to determine the equivalent source.

In general, a cost functional may be provided, wherein the cost functional is associated with a deviation of simulated electromagnetic waves generated by the equivalent source 30 from the measured electromagnetic waves. In other words, the cost functional corresponds to an error measure that indicates how closely the equivalent source 30 resembles the actual electromagnetic properties of the device under test 12.

Thus, if the value of the cost functional is large, further adaptations to the equivalent source 30 may be necessary. If the value of the cost functional is small, the equivalent source 30 is an accurate representation of the device under test 12.

The cost functional may be minimized by appropriately adapting parameters of the equivalent source 30, namely the at least one equivalent electric current $J_A$ and/or the at least one equivalent magnetic current $M_A$, thereby determining the equivalent source 30.

As the cost functional describes the deviation of the simulated electromagnetic waves generated by the equivalent source 30 from the measured electromagnetic waves, the optimal equivalent source can be determined by minimizing the cost functional.

Therein, the term "optimal equivalent source" is understood to denote an equivalent source that resembles the electromagnetic properties of the device under test 12 as closely as possible based on the first set of measurements.

The determined equivalent source 30 is iteratively adapted based on at least one further set of measurements performed on at least one further measurement surface $\Sigma_2$ (step S4). In other words, the steps S1 to S3 described above are repeated, but on a second measurement surface $\Sigma_2$.

At least one second radiation parameter is determined based on the second set of measurements. Based on the at least one determined second radiation parameter, the determined equivalent source 30 is adapted in order to match the at least one determined second radiation parameter.

Figure 4:
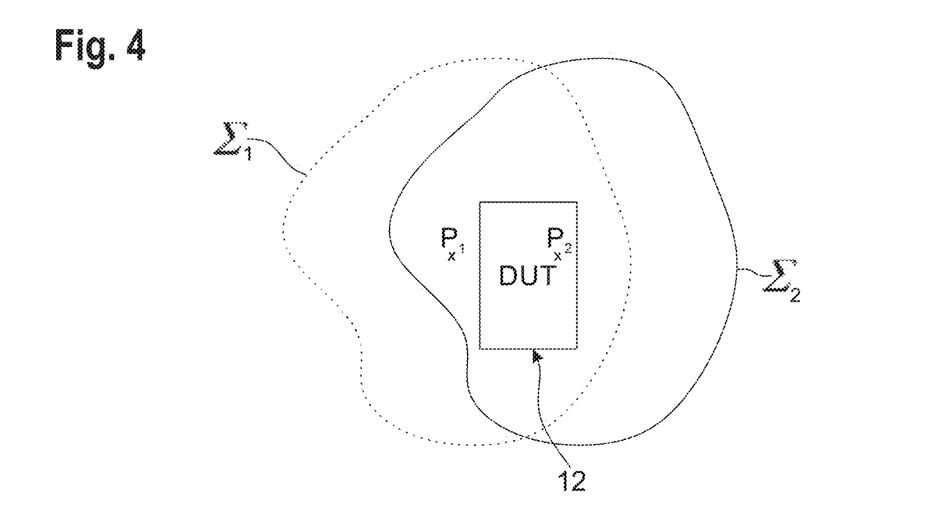
FIG. 4 shows a further diagram illustrating individual steps of the method of FIG. 2.

As is illustrated in FIG. 4, the second measurement surface $\Sigma_2$ is different from the first measurement surface $\Sigma_1$. In the example shown in FIG. 4, the first measurement surface $\Sigma_1$ and the second measurement surface $\Sigma_2$ have the same shape, but have different center points $P_1$ and $P_2$, respectively. However, FIG. 4 has to be understood as a mere illustration. In some embodiments, the first measurement surface $\Sigma_1$ and the second measurement surface $\Sigma_2$ may differ in various ways.

The measurement surfaces $\Sigma_1$, $\Sigma_2$ each may have a defined arbitrary shape, wherein the shapes of the measurement surfaces $\Sigma_1$, $\Sigma_2$ may also be different from each other. The distances of the measurement surfaces $\Sigma_1$, $\Sigma_2$ from the device under test 12 may be the same.

The measurement surfaces $\Sigma_1$, $\Sigma_2$ may each have a defined arbitrary distance from the device under test 12, wherein the distances of the measurement surfaces $\Sigma_1$, $\Sigma_2$ from the device under test 12 are different from each other. The shapes of the measurement surfaces $\Sigma_1$, $\Sigma_2$ may be the same.

Therein, the term "distance from the device under test" is understood to denote the distance between the device under test 12 and the point of the respective measurement surface $\Sigma_1$, $\Sigma_2$ being nearest to the device under test. Alternatively, the term "distance from the device under test" may denote the distance between the device under test 12 and a centroid, i.e. a geometric center of the respective measurement surface $\Sigma_1$, $\Sigma_2$.

A first one of the measurement surfaces $\Sigma_1$, $\Sigma_2$ may be located in a near-field region of the device under test 12, and a second one of the measurement surfaces $\Sigma_1$, $\Sigma_2$ may be located in a far-field region of the device under test 12. However, it is to be understood that any other combinations are also possible. For example, a first one of the measurement surfaces $\Sigma_1$, $\Sigma_2$ may be located in a near-field region of the device under test 12, and a second one of the measurement surfaces $\Sigma_1$, $\Sigma_2$ may be located in a transition zone of the device under test 12.

The measurement surfaces $\Sigma_1$, $\Sigma_2$ each may have a defined arbitrary center point, wherein distances between the respective center point and the device under test 12 are different from each other.

The steps described above may be repeated iteratively for further sets of measurements on further measurement surfaces. By iteratively determining the equivalent source 30 as described above, the space of possible solutions for the equivalent source 30 is iteratively confined further and further. Thus, a particularly accurate equivalent source 30 can be determined by the method described above.

The determined equivalent source 30 may then be used, by another measurement application or by the OTA test system 10, for example by the simulation circuit 26, in order to simulate the properties of the device under test 12 in a variety of different scenarios.

In some embodiments, interactions of the electromagnetic waves emitted by the device under test 12 with a scattering object may be simulated. For example, the scattering object may be an object in the environment of the device under test 12, such as a car or another vehicle, certain components of a car or of another vehicle, a tree or other plants, a building, a mountain, etc. As a further example, the scattering object may correspond to biological material. For example, the scattering object may be a human or a certain body part of a human, for example a human head or a human torso.

Thus, a realistic simulation of an interaction of the device under test 12 with biological material matter is provided, for example of the absorption of electromagnetic waves generated by the device under test 12 in the biological material.

Alternatively or additionally, the determined equivalent source 30 may be used in order to extrapolate the measured electromagnetic fields into different regions. For example, the determined equivalent source may be used for near-field to far-field transformations, near-field to near-field transformations, far-field to near-field transformations, etc.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Some embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Some of the embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented at least in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, that can direct one or more computers or computing devices or other programmable data processing apparatus (es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform (e.g., are configured to carry out) the specified functions or operations, or combinations of special purpose hardware and computer instructions.

According to some embodiments, many individual steps of a process may or may not be carried out utilizing computer or computing based systems described herein, and the degree of computer implementation may vary, as may be desirable and/or beneficial for one or more particular applications. In some embodiments, the method and embodiments thereof have been described as performing sequential steps. However, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

Of course, in some embodiments, two or more of components described above, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of determining an equivalent source associated with a device under test by an over-the-air test (OTA) test system, wherein the OTA test system comprises an analysis circuit and at least one measurement antenna, the method comprising:
   conducting, by the at least one measurement antenna, at least two sets of measurements of electromagnetic waves emitted by the device under test, thereby generating measurement signals associated with the electromagnetic waves;
   determining, by the analysis circuit, at least one radiation parameter of the device under test based on the measurement signals, wherein the at least one radiation parameter is associated with the electromagnetic waves emitted by the device under test;
   determining, by the analysis circuit, an equivalent source on a Huygens surface based on the at least one determined radiation parameter, wherein the equivalent source is associated with the device under test;
   wherein the at least two sets of measurements are conducted on at least two measurement surfaces, wherein the at least two measurement surfaces are different from each other.

2. The method of claim 1, wherein the equivalent source comprises at least one equivalent electric current and/or at least one equivalent magnetic current.

3. The method of claim 1, wherein the equivalent source is determined by solving a corresponding inverse mathematical equation based on the at least one determined radiation parameter.

4. The method of claim 3, wherein a cost functional is provided, wherein the cost functional is associated with a deviation of simulated electromagnetic waves generated by the equivalent source from the measured electromagnetic waves.

5. The method of claim 4, wherein the cost functional is minimized or maximized in order to determine the equivalent source.

6. The method of claim 1, wherein the equivalent source is determined iteratively based on the at least two sets of measurements.

7. The method of claim 6, wherein more than two sets of measurements are conducted on more than two measurement surfaces.

8. The method of claim 1, wherein the at least one radiation parameter comprises at least one of an amplitude of electromagnetic waves emitted by the device under test and a phase of electromagnetic waves emitted by the device under test.

9. The method of claim 1, wherein the at least two measurement surfaces are located in a near-field region of the device under test, in a far-field region of the device under test, and/or in a transition zone between the near-field region and the far-field region.

10. The method of claim 1, wherein the at least two measurement surfaces each have a defined arbitrary shape, wherein the shapes of the at least two measurement surfaces are different from each other.

11. The method of claim 1, wherein the at least two measurement surfaces each have a defined arbitrary distance from the device under test, wherein the distances of the at least two measurement surfaces from the device under test are different from each other.

12. The method of claim 1, wherein a first one of the at least two measurement surfaces is located in a near-field region of the device under test, and wherein a second one of the at least two measurement surfaces is located in a far-field region of the device under test.

13. The method of claim 1, wherein the at least two measurement surfaces each have a defined arbitrary center point, wherein distances between the respective center point and the device under test are different from each other.

14. The method of claim 1, wherein the at least two sets of measurements each comprise a plurality of measurements at different measurement locations on the respective measurement surface.

15. The method of claim 1, wherein the equivalent source is determined based on an adaptive boundary condition.

16. The method of claim 15, wherein the equivalent source is determined based on the Love condition and/or based on a fixed impedance condition.

17. The method of claim 1, wherein the device under test is placed in an anechoic chamber, and wherein the electromagnetic waves are measured in the anechoic chamber.

18. The method of claim 1, wherein the device under test is a base station or a mobile communication device.

19. An over-the-air (OTA) test system, comprising:
at least one measurement antenna and an analysis circuit,
wherein the OTA test system is configured to conduct, by the at least one measurement antenna, at least two sets of measurements of electromagnetic waves emitted by a device under test, thereby generating measurement signals associated with the electromagnetic waves,
wherein the OTA test system is configured to conduct the at least two sets of measurements on at least two measurement surfaces, wherein the at least two measurement surfaces are different from each other,
wherein the analysis circuit is configured to determine at least one radiation parameter of the device under test based on the measurement signals, wherein the at least one radiation parameter is associated with the electromagnetic waves emitted by the device under test, and
wherein the analysis circuit is configured to determine an equivalent source on a Huygens surface based on the at least one determined radiation parameter, wherein the equivalent source is associated with the device under test.

20. The OTA test system of claim 19, wherein the OTA test system is configured to adapt a location and/or orientation of the device under test, and/or wherein the OTA test system is configured to adapt a location and/or orientation of the at least one measurement antenna.

* * * * *